(12) United States Patent
Bouquier et al.

(10) Patent No.: US 7,648,167 B2
(45) Date of Patent: Jan. 19, 2010

(54) AIRBAGS FORMED WITH EFFICIENT USE OF MATERIALS AND METHODS OF FORMING SUCH AIRBAGS

(75) Inventors: Benoit Bouquier, Villeurbane (FR); Xavier Manssart, Villeurbanne (FR); Isabel Vercher, Thil (FR); Jean-Marc Obadia, Villefontaine (FR); Aline Landry, Lyons (FR)

(73) Assignee: Zodiac Automotive US Inc., Tempe, AZ (US)

( * ) Notice: Subject to any disclaimer, the term of this patent is extended or adjusted under 35 U.S.C. 154(b) by 426 days.

(21) Appl. No.: 11/544,976

(22) Filed: Oct. 6, 2006

(65) Prior Publication Data
US 2008/0084053 A1 Apr. 10, 2008

(51) Int. Cl.
B60R 21/16 (2006.01)
(52) U.S. Cl. .................................... 280/743.1
(58) Field of Classification Search ............... 280/743.1; B60R 21/16
See application file for complete search history.

(56) References Cited
U.S. PATENT DOCUMENTS

| 6,494,484 | B2 | 12/2002 | Bosgieter et al. |
| 6,685,215 | B2 | 2/2004 | Keshavaraj |
| 6,695,346 | B1 | 2/2004 | Keshavaraj |
| RE39,002 | E | 3/2006 | Keshavaraj |
| 2001/0020779 | A1 | 9/2001 | Bosgieter et al. |
| 2002/0043792 | A1* | 4/2002 | Keshavaraj ............... 280/743.1 |
| 2004/0124620 | A1 | 7/2004 | Keshavaraj |
| 2004/0262902 | A1* | 12/2004 | Keshavaraj ............... 280/743.1 |

OTHER PUBLICATIONS

International Search Report and Written Opinion in related International Application No. PCT/US07/80529.

* cited by examiner

*Primary Examiner*—Ruth Ilan
(74) *Attorney, Agent, or Firm*—Dean W. Russell; Kilpatrick Stockton LLP

(57) ABSTRACT

Inflatable devices such as airbags are detailed. The bags may be formed of components well nested on linear rolls of material, reducing material wastage. The airbags additionally may, in some cases, be formed of components lacking curved surfaces; in certain cases the bag components additionally may have complementary surfaces that, although formed of straight segments, resemble convex and concave shapes.

8 Claims, 5 Drawing Sheets

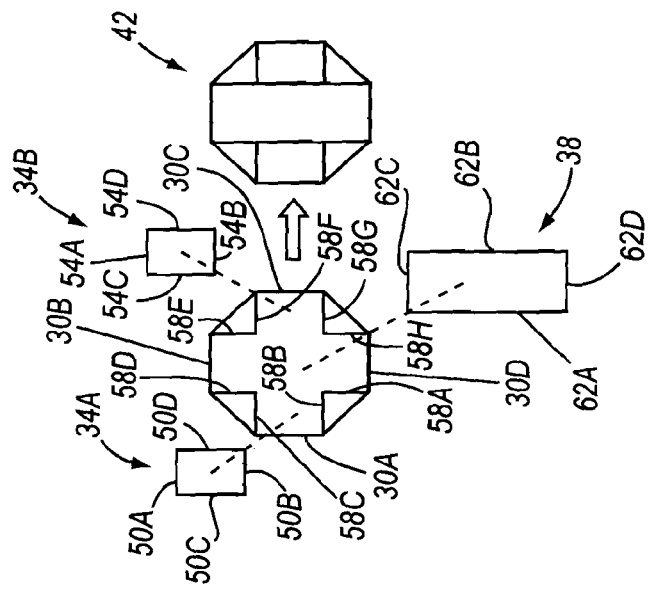
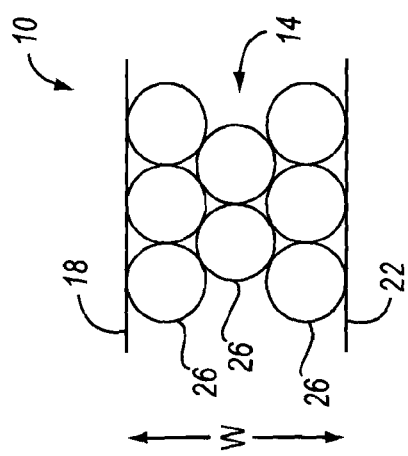
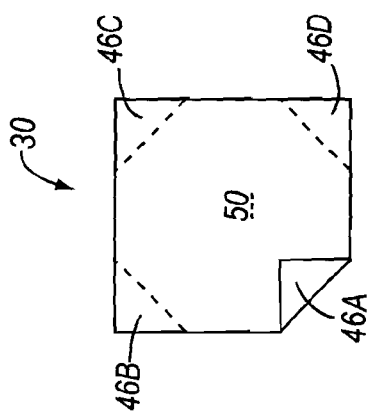

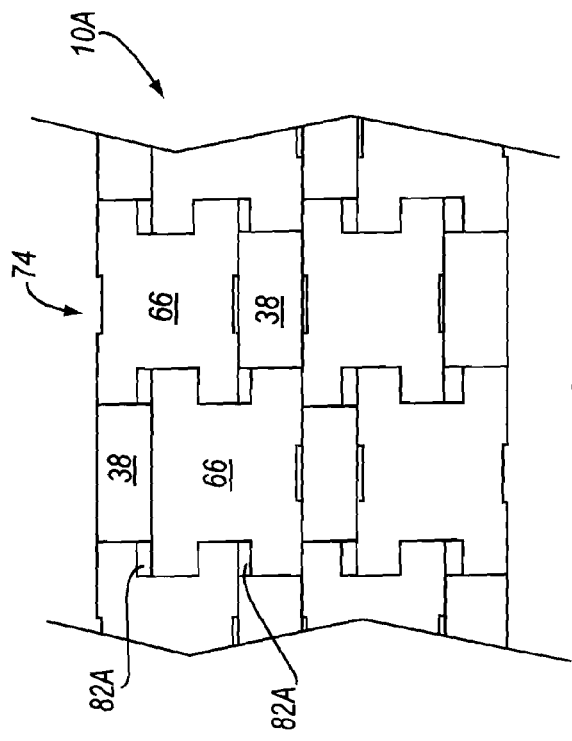
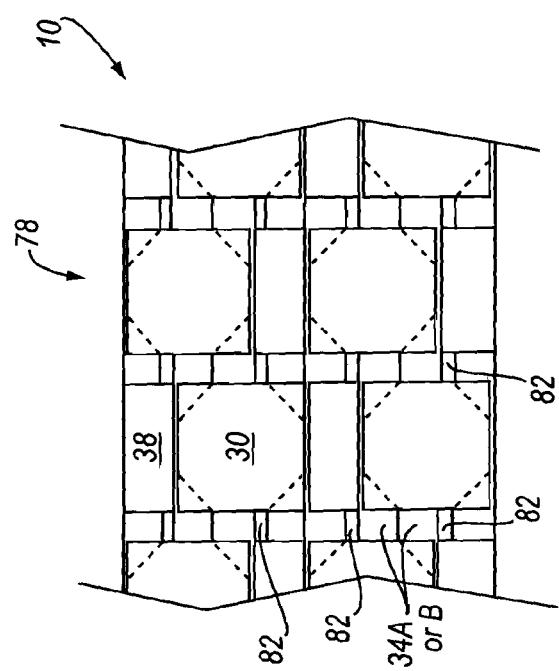
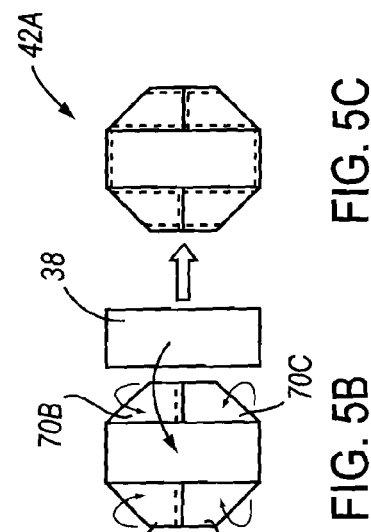
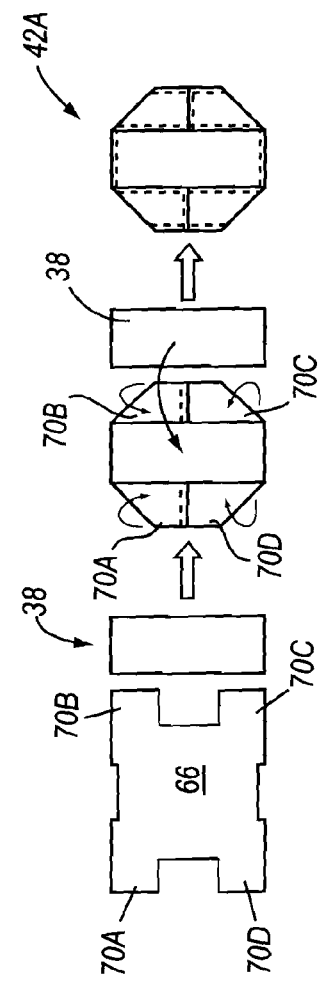

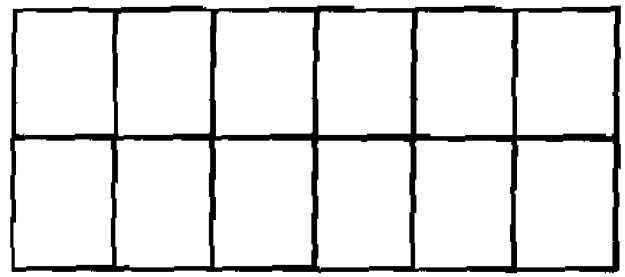
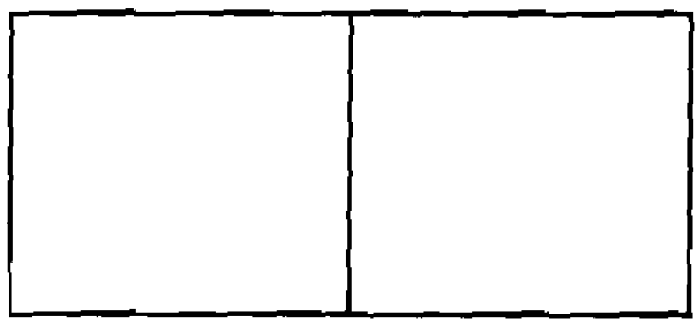
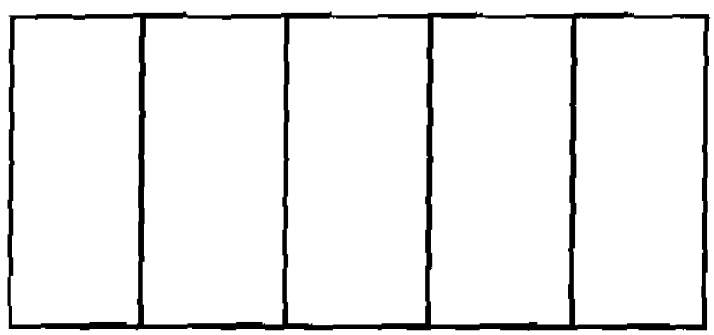
FIG. 4A

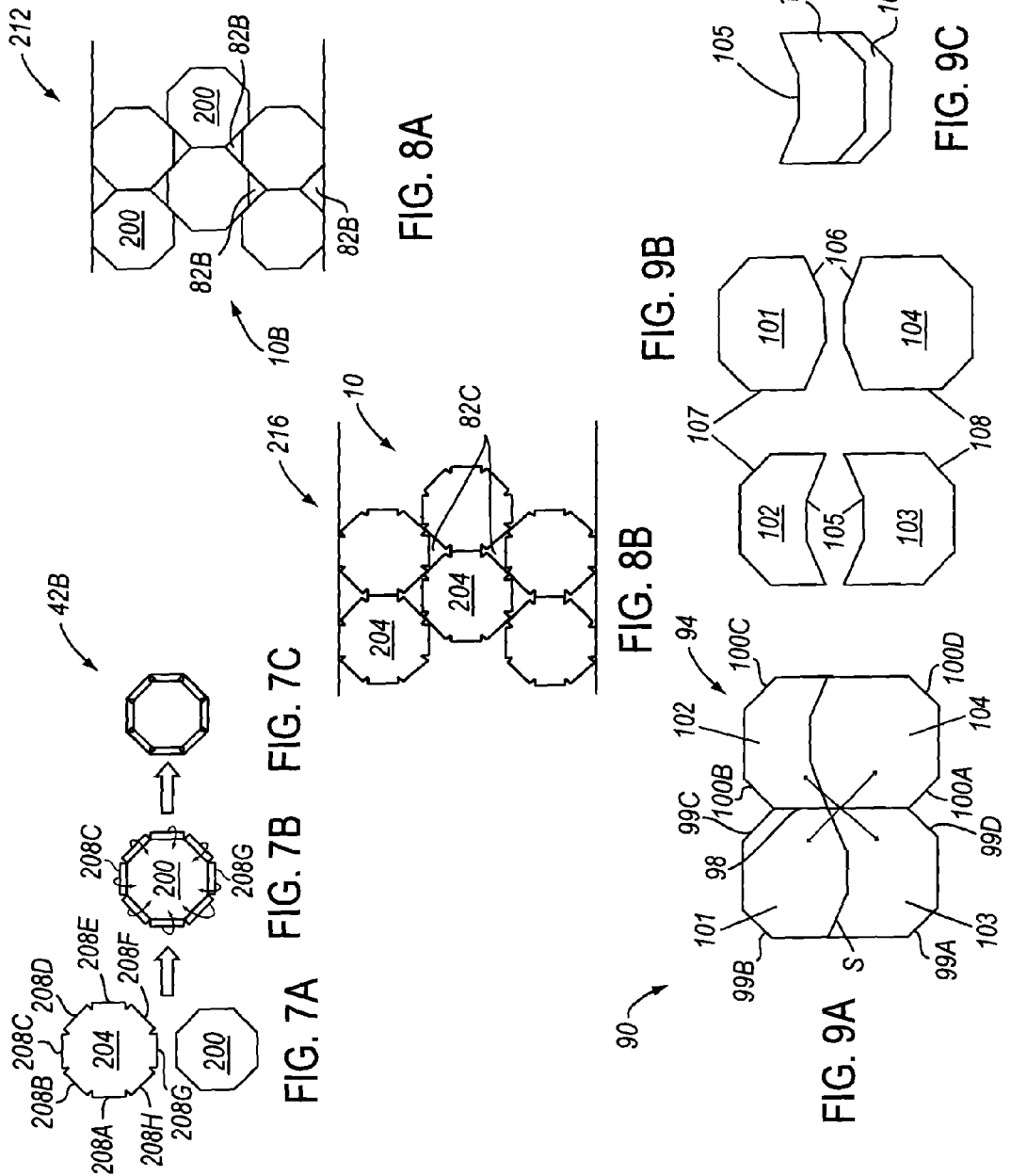

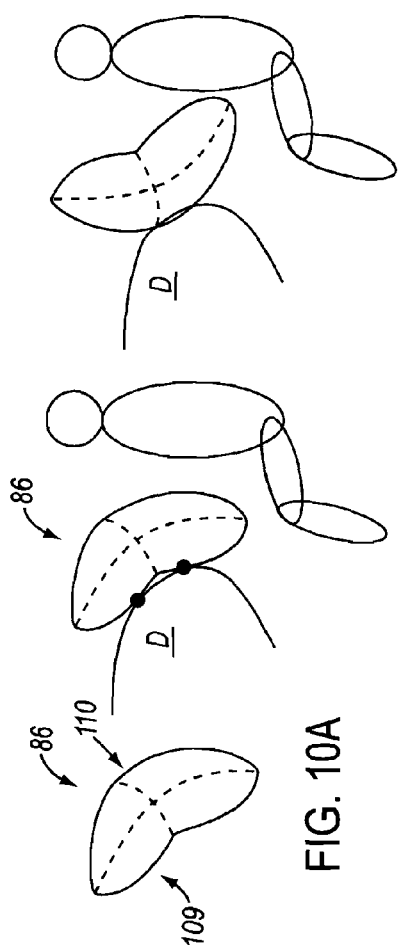
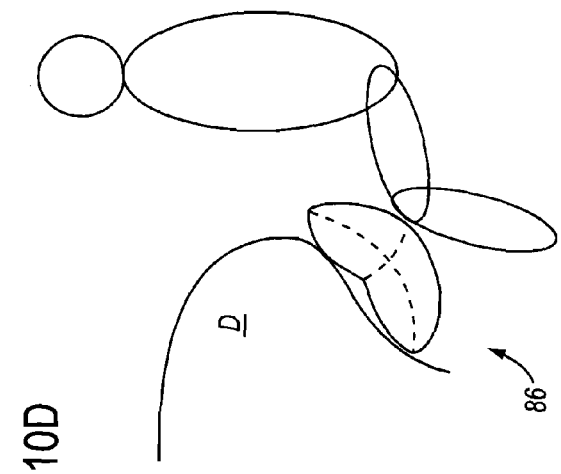
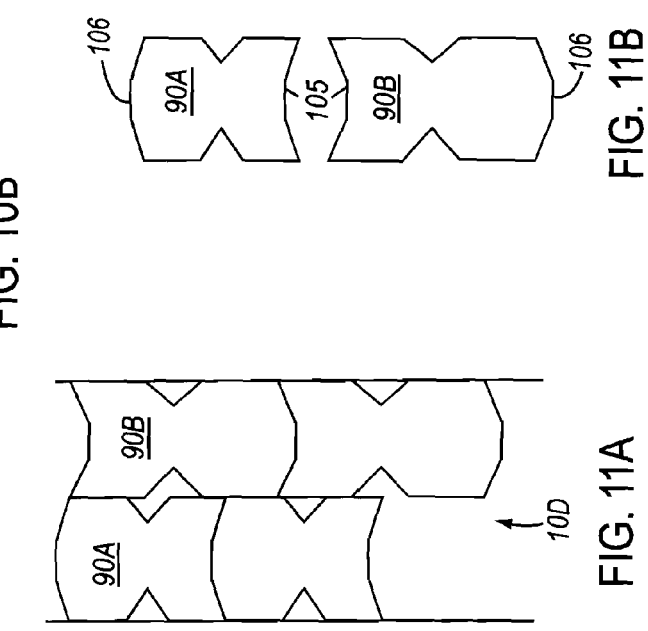
FIG. 10A
FIG. 10B
FIG. 10C
FIG. 10D
FIG. 11A
FIG. 11B

AIRBAGS FORMED WITH EFFICIENT USE OF MATERIALS AND METHODS OF FORMING SUCH AIRBAGS

FIELD OF THE INVENTION

This invention relates to inflatable devices, components of such devices, and methods of forming the devices from the components. More particularly (but not exclusively), the invention relates to occupant airbags for passenger vehicles and techniques for manufacturing the bags.

BACKGROUND OF THE INVENTION

Certain current airbags for passenger vehicles frequently comprise two circular pieces of fabric sewn or woven together. Because the fabric from which the airbags are made typically is supplied in linear rolls, substantial waste remains after circular pieces are cut from the linear rolls. Indeed, useful bag surface obtained from the total surface available on a roll is usually no greater than eighty-seven percent, resulting in waste equivalent to at least thirteen percent of the total available fabric.

Whether or not circular, two-panel airbags often are used for front-seat passengers because they are easy to produce, in that they may be sewn flat at their perimeters or peripheries. Generally, however, these bags are not well adapted for placement in automobile dashboards, potentially degrading deployment and stability during occupant impact. Consequently, three-panel bags have been designed for better correspondence with dashboard surfaces.

Such three-panel bags may comprise two lateral panels of identical shape and one frontal panel of different shape. Including multiple panels of different shapes complicates the design, though, increasing assembly difficulty. Further, fabric consumption likely will be greater than for simpler designs, as nesting of multiple, complex shapes on linear rolls is difficult.

Needed, therefore, are airbag designs permitting more efficient usage of fabric or similar materials from which they are constructed. For at least some bags, further, needed are designs well fitted to complement surfaces of dashboards of automobiles. Such airbags additionally should, if possible, be easy to assemble.

SUMMARY OF THE INVENTION

The present invention fulfills (at least) these needs. Techniques of the present invention provide improved nesting of component pieces on linear or other rolls of material without sacrificing ease of assembly. They also supply three-dimensional assemblies for use with, in particular, front-seat passengers, with the assemblies allowing for satisfactory stability of the bags when associated with vehicle dashboards. Such three-dimensional assemblies, moreover, are relatively easy to form and have components that nest well on linear or other fabric rolls, particularly for bonding assembly.

Certain embodiments of the invention incorporate use of rectangular (including square) components, in lieu of circular ones, to form airbags of octagonal shape. The collective set of components may utilize an entire linear roll of fabric with little or no cutting waste. Through folding and other manipulation of the rectangular components, an octagonal shape may be devised for the inflatable airbag. Alternatively, compound component shapes including rectangles and other polygons (but preferably not curved surfaces) may be used instead of some rectangles, again with less waste than conventional solutions.

Other embodiments of the invention likewise utilize straight-line surfaces from which complementary substitutes for curved convex and concave surfaces may be created without waste of fabric. Components including these surfaces may then be assembled to form a generally curved structure that is relatively stable when deployed between a dashboard and vehicle occupant.

It thus is an optional, non-exclusive object of the present invention to provide inflatable devices able to be formed with reduced waste of construction materials.

It is another optional, non-exclusive object of the present invention to provide inflatable devices, in the form of airbags, that are easy to assemble.

It is also an optional, non-exclusive object of the present invention to provide airbags utilizing components that are non-circular in shape.

It is a further optional, non-exclusive object of the present invention to provide airbags having panels formed of fabric shaped as rectangles, other polygons, or other compound shapes.

It is, moreover, an optional, non-exclusive object of the present invention to provide airbags having generally octagonal shape or other shapes lacking curved edges.

It is an additional optional, non-exclusive object of the present invention to provide airbags using panels having complementary pseudo-curved surfaces.

It is yet another optional, non-exclusive object of the present invention to provide airbags having curved structure when inflated yet relatively stably-positioned with respect to dashboards or other areas from which they deploy.

Other objects, features, and advantages of the present invention will be apparent to those skilled in the relevant art with reference to the remaining text and drawings of this application.

BRIEF DESCRIPTION OF THE DRAWINGS

FIG. 1 is a plan view of an exemplary linear strip of material showing a pattern from which conventional circular components may be cut.

FIG. 2 is a plan view of an exemplary rectangular component showing folds which may be made during construction of an airbag.

FIG. 3 is a plan view of the component of FIG. 2 together with other components which may be assembled into an octagonally-shaped airbag.

FIG. 4 is a plan view of an exemplary linear strip of material showing a pattern from which components such as those depicted in FIGS. 2-3 may be cut.

FIG. 4A illustrates alternate patterns from which components may be cut.

FIGS. 5A-C are plan views of first alternate components which may be assembled into an octagonally-shaped airbag.

FIG. 6 is a plan view of a first alternate exemplary linear strip of material showing a pattern from which components such as those depicted in FIGS. 5A-C may be cut.

FIGS. 7A-C are plan views of second alternate components which may be assembled into an octagonally-shaped airbag.

FIGS. 8A-B are plan views of second alternate exemplary linear strips of material showing patterns from which components such as those depicted in FIGS. 7A-C may be cut.

FIGS. 9A-B are plan views of two panels of materials cut to form airbag components having complementary pseudo-convex and -concave surfaces.

FIG. 9C is a plan view of an assembly of two components of FIGS. 9A-B having pseudo-concave surfaces.

FIGS. 10A-D are plan views of an airbag constructed of the components of FIGS. 9A-C.

FIG. 11A is a plan view of an exemplary linear strip from which alternate components having pseudo-convex and -concave surfaces may be cut.

FIG. 11B is a plan view of the alternate components of FIG. 11A.

DETAILED DESCRIPTION

Depicted in FIG. 1 is an example of a linear strip 10 of fabric or other material 14 from which airbag components may be removed. Strip 10 typically is, but need not necessarily be, part of a roll of material 14. Similarly, strip 10 usually has parallel edges 18 and 22 and a selected width W. Material 14 beneficially comprises fabric sufficiently impervious to air or other inflation fluid so as to allow the airbag of which it is made to deploy successfully.

Also detailed in FIG. 1 are a series of circular patterns 26 providing guidance for forming circular airbag panels. Patterns 26 are nested, or positioned, along strip 10 so as to minimize unused (wasted) material 14. Although such nesting may optimize utilization of material 14, the fact that circular patterns 26 are employed results in only approximately eighty-seven percent (or less) of material 14 being beneficially used. In particular, because each piece cut consistent with patterns 26 will have a curved, circular periphery, it must be positioned tangent to adjacent pieces along strip 10—rather than abutting such adjacent pieces along most or all of its periphery.

FIG. 2 shows component 30 cut from a pattern that forms an alternative to pattern 26. Component 30 is in the form of a square or other rectangle and, notably, lacks any curvature in its periphery. Although conceivably alternatives to pattern 30 with some peripheral curvature could be designed, preferred at present is that pattern 30 define only straight-line peripheries. Consequently, along strip 10 the pattern for component 30 may abut other patterns with straight-line peripheries along a length substantially greater than if the peripheries were only tangent.

Illustrated in FIG. 3 are additional components 34A, 34B, and 38. Each of these additional components 34A-B and 38 is rectangular in shape and thus, like component 30, includes only straight-line peripheries. As detailed in FIG. 3, components 30, 34A-B, and 38 may be assembled to form an octagonally-shaped airbag 42.

To create airbag 42, triangular corners 46A-D of component 30 may be folded atop central portion 50 of the component 30 (as shown for corner 46A in FIG. 2 and for all corners 46A-D in FIG. 3). Such folding creates an octagonal periphery for component 30. Components 34A-B and 38 may then be connected to each other in a cruciform shape and connected to corners 46A-D to form the enclosed octagonal structure of airbag 42. (Airbag 42 thereafter may be processed to incorporate or be linked to an inflation mechanism for use in vehicles.)

In particular, each of edges 50A-B of component 34A, edges 54A-B of component 34B, and edges 58A-H of corners 46A-D has approximately (or identically) the same length. Likewise, each of edges 50C-D of component 34A and edges 54C-D of component 34B has approximately or identically the same length. Edges 62A-B of component 38 have length approximately or identically equal to the sum of the lengths of edges 58A, 50D, and 58D, for example, while edges 62C-D each have approximately or identically the same length as edges 30B and 30D. Finally, the lengths of edges 50C and 54D may approximately or identically match those of edges 30A and 30C.

Accordingly, to create airbag 42:
1. edge 50A may be connected to edge 58C;
2. edge 50B may be connected to edge 58B;
3. edge 50C may be connected to edge 30A;
4. edge 54A may be connected to edge 58F;
5. edge 54B may be connected to edge 58G;
6. edge 54D may be connected to edge 30C;
7. edge 62C may be connected to edge 30B;
8. edge 62D may be connected to edge 30D;
9. edge 62A may be connected to edges 58D, 50D, and 58A; and
10. edge 62B may be connected to edges 58E, 54C, and 58H.

These connections may be made in any desired sequence and advantageously may occur through sewing, bonding, or welding of material 14 (and either with or without additional connection strips). Those skilled in the relevant art will, however, recognize that any connection means suitable for use with material 14 may be used instead.

Disclosed in FIG. 4 are patterns 78 from which pieces such as components 30, 34A-B, and 38 may be cut from strip 10 of material 14 with little waste. By contrast with FIG. 1, FIG. 4 illustrates only small areas 82 of waste existing in strip 10 between patterns 78. Areas 82 clearly constitute substantially less than thirteen percent of the surface area of strip 10; consequently, greater efficiency in use of material 14 may be achieved.

FIGS. 5A-C detail an alternate assembly technique for an octagonally-shaped airbag 42A. Airbag 42A again may comprise component 38. However, rather than also including components 30 and 34A-B, airbag 42A additionally comprises (a single) component 66 of complex polygonal shape. Component 66 preferably has straight edges and corners 70A-D which may be folded as depicted in FIG. 5B. Edges of the corners 70A-D thereafter may be connected to component 38, corner 70A may be connected to corner 70D, and corner 70B may be connected to corner 70C to form airbag 42A (as shown in FIGS. 5B-C). Illustrated in FIG. 6 are patterns 74 from which pieces such as components 38 and 66 may be cut from strip 10A of material 14, again with substantially less waste 82A than currently exists.

Detailed in FIGS. 7A-C is another alternate assembly technique for an octagonally-shaped airbag 42B. Airbag 42B may be formed of components 200 and 204, with component 200 being octagonal in shape and component 204 being generally so. Specifically, however, component 204 is of complex polygonal shape, with (preferably) eight rectangular edge sections 208A-H that may be folded over and attached to component 200 to create airbag 42B. FIGS. 8A-B illustrate respective patterns 212 and 216 from which components 200 and 204 may be cut from strips 10B-C of material with little waste 82B-C.

FIGS. 9A-10D depict creation of an alternative airbag 86. Designed principally (although not necessarily exclusively) for protection of non-driver, front-seat vehicle passengers, airbag 86 is configured for enhanced stability when deployed from a dashboard D (or other location). Components of airbag 86 also nest well on strips 10.

Illustrated in FIG. 9A are panels 90 and 94, which may be cut from strip 10. If adjacent on strip 10, panels 90 and 94 may share common (straight) edge 98 prior to separation. In preferred versions of airbag 86, panels 90 and 94 are polygons, being substantially rectangular in shape but with tapered corners 99A-D and 100A-D. A generally-serpentine cut S (albeit formed of straight-line segments) through panels 90 and 94 may be made so that, when panels 90 and 94 also are severed along edge 98, four components 101-104 are created. Each of components 101 and 104 thus has a generally-convex edge 106, while each of components 102 and 103 has a complementary generally-concave edge 105. Hence, although the perimeter of combined components 101 and 104 remains equal to that of combined components 102 and 103, the surfaces of each combination differ.

This difference permits airbag 86 to be curved as shown in FIGS. 10A-D. To form airbag 86, (1) components 102 and 103 may be connected along their respective versions of edge 105 (see, e.g., FIG. 9C), (2) components 101 and 104 may be connected along their respective versions of edge 106, (3) components 101 and 102 may be connected along their respective versions of edge 107, and (4) components 103 and 104 may be connected along their respective versions of edge 108. As with other connections described herein, any appropriate connection method may be utilized. Preferably, though, such connections result from sewing, bonding, or welding. Similarly, such connections may occur in any appropriate order or sequence. Finally, because of the shapes and structures of components 101-104, assembly of airbag 86 may occur edge-to-edge and with components 101-104 flat.

As curved, airbag 86 presents a somewhat concave face 109 to dashboard D when deployed and a somewhat convex face 110 to a vehicle occupant (see FIGS. 10B-C). Face 109 clearly accommodates, if not complements, the somewhat convex shape of dashboard D. Face 110 presents a satisfactory surface for contact by the occupant during a crash. (Alternatively, airbag 86 may deploy as illustrated in FIG. 10D, for example.) As depicted in FIG. 10C, airbag 86 may be especially useful for protecting knees of occupants.

FIGS. 11A-B detail alternate panels 90A and 90B which may be cut from linear strip 10D of material 14. Each panel 90 and 90B includes an edge 105 cut in multiple straight segments to form a generally-concave shape and a straight edge 106 whose segments form a generally-convex shape. Appropriate edges of panels 90A and 90B may be joined to create airbag 86. Alternatively, airbag 86 may be formed of components having curved edges using methods including (but not limited to) sewing, bonding, or welding.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of constructing an inflatable device in the form of a vehicle airbag, comprising:
    a. providing a strip of material;
    b. removing from the strip of material at least first and second components, each of which first and second components is non-circular in shape and includes at least one generally straight edge;
    c. assembling, edge to edge, at least the first and second components along at least a portion of their respective generally straight edges;
    d. connecting, edge to edge, to the first component a third component having a generally convex edge;
    e. connecting, edge to edge, to the second component a fourth component having a generally concave edge; and
    f. connecting the third and fourth components along a respective edge of each to construct the vehicle airbag configured to be curved when inflated so as to include a generally convex face and a generally concave face.

2. A method according to claim 1 in which the first component further includes a generally convex edge and the second component includes a generally concave edge.

3. An airbag comprising:
    a. first and second components, each having a first edge and a generally-convex edge; and
    b. third and fourth components, each having a first edge and a generally-concave edge; and
    in which (i) respective generally-convex edges of the first and second components are connected together, (ii) respective generally-concave edges of the third and fourth components are connected together, (iii) respective first edges of the first and third components are connected together, and (iv) respective first edges of the second and fourth components are connected together.

4. An airbag according to claim 3 in which each of the first edges comprises a straight portion.

5. An airbag according to claim 4 in which each of the first edges further comprises a tapered portion.

6. An airbag according to claim 5 in which the first, second, third, and fourth components are formed, at least in part, by cutting material in generally serpentine manner.

7. An airbag according to claim 3 in which at least one of the first, second, third, or fourth components comprises a first edge that includes a curved portion.

8. An airbag according to claim 7 in which each of the first edges includes a curved portion.

* * * * *

UNITED STATES PATENT AND TRADEMARK OFFICE
CERTIFICATE OF CORRECTION

| | | |
|---|---|---|
| PATENT NO. | : 7,648,167 B2 | Page 1 of 1 |
| APPLICATION NO. | : 11/544976 | |
| DATED | : January 19, 2010 | |
| INVENTOR(S) | : Bouquier et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Sixteenth Day of November, 2010

David J. Kappos
*Director of the United States Patent and Trademark Office*